(12) United States Patent
Hu et al.

(10) Patent No.: US 11,774,800 B1
(45) Date of Patent: Oct. 3, 2023

(54) DISPLAY DEVICE, BACKLIGHT MODULE AND CONTROL METHOD

(71) Applicant: HKC CORPORATION LIMITED, Shenzhen (CN)

(72) Inventors: Yuangang Hu, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/091,404

(22) Filed: Dec. 30, 2022

(30) Foreign Application Priority Data

Jul. 26, 2022 (CN) .......................... 202210886689.7

(51) Int. Cl.
*G02F 1/13357* (2006.01)
*G02F 1/1335* (2006.01)
*G02F 1/1333* (2006.01)

(52) U.S. Cl.
CPC .... *G02F 1/133611* (2013.01); *G02F 1/13336* (2013.01); *G02F 1/133391* (2021.01); *G02F 1/133603* (2013.01); *G02F 1/133607* (2021.01)

(58) Field of Classification Search
CPC ......... G02F 1/133607; G02F 1/133611; G02F 1/133391; G02F 1/13336; G02B 6/0078
See application file for complete search history.

(56) References Cited

U.S. PATENT DOCUMENTS

| | | | | |
|---|---|---|---|---|
| 2006/0187660 | A1* | 8/2006 | Liu | F21V 29/763 362/249.02 |
| 2010/0079977 | A1* | 4/2010 | Lee | G02F 1/133611 362/97.1 |
| 2010/0182534 | A1 | 7/2010 | Usukura et al. | |
| 2020/0341333 | A1 | 10/2020 | Qiu | |

(Continued)

FOREIGN PATENT DOCUMENTS

| | | |
|---|---|---|
| CN | 111208673 A | 5/2020 |
| CN | 111915982 A | 11/2020 |

(Continued)

OTHER PUBLICATIONS

Applied Optics Issue 06,Meng Fan-hus, Seamless filed display based on rear projection, mailed Nov. 15, 2010 (23 pages).

(Continued)

*Primary Examiner* — Julie A Bannan

(57) ABSTRACT

A backlight module includes a lamp panel and a light-guide assembly. The lamp panel includes a plurality of light-emitting plates spliced to each other, a seam is generated between two adjacent light-emitting plates of the plurality of light-emitting plates, each of the plurality of light-emitting plates comprises a plurality of light-emitting elements; a light-guide assembly, arranged at the seam, a height of the light-guide assembly in a direction perpendicular to the lamp panel is greater than a height of each of the plurality of light-emitting elements, a surface of a side of the light-guide assembly away from the plurality of light-emitting plates is recessed toward the seam, and a part of light, which is (Continued)

emitted from any light-emitting element of the plurality of light-emitting elements arranged at edges of the two adjacent light-emitting plates and near the seam, is refracted by the light-guide assembly to propagate towards the seam.

15 Claims, 6 Drawing Sheets

(56) References Cited

U.S. PATENT DOCUMENTS

| | | | |
|---|---|---|---|
| 2022/0206339 A1 | 6/2022 | Sun et al. | |
| 2022/0252939 A1 | 8/2022 | Wang et al. | |

FOREIGN PATENT DOCUMENTS

| | | | | |
|---|---|---|---|---|
| CN | 112002217 A | | 11/2020 | |
| CN | 112596303 A | | 4/2021 | |
| CN | 113327515 A | | 8/2021 | |
| CN | 114203058 A | | 3/2022 | |
| CN | 114203069 A | | 3/2022 | |
| CN | 114265237 A | | 4/2022 | |
| CN | 114265240 A | | 4/2022 | |
| CN | 114267261 A | | 4/2022 | |
| CN | 114442370 A | | 5/2022 | |
| CN | 114545685 | * | 5/2022 | ....... G02F 1/133608 |
| CN | 216697683 U | | 6/2022 | |
| CN | 114779525 A | | 7/2022 | |
| JP | 2009283419 A | | 12/2009 | |
| JP | 2011253648 A | | 12/2011 | |
| KR | 20060135109 | * | 12/2006 | ....... G02F 1/133606 |
| KR | 20120070825 A | | 7/2012 | |
| KR | 20200071651 A | | 6/2020 | |
| WO | 2019085628 A1 | | 5/2019 | |
| WO | 2020029632 A1 | | 2/2020 | |
| WO | 2021208638 A1 | | 10/2021 | |
| WO | 2022056918 A1 | | 3/2022 | |
| WO | 2022077411 A1 | | 4/2022 | |
| WO | 2022088590 A1 | | 5/2022 | |
| WO | 2022111679 A1 | | 6/2022 | |
| WO | 2022141479 A1 | | 7/2022 | |

OTHER PUBLICATIONS

Proceedings of Spie—The, International society for optical engineering, Liu Hongyi, Layout decomposition and synthesis for a modular technology to solve the edge-placement challenges by combining selective etching, direct stitching, and alternating-material self-aligned multiple patterning processes (10 pages).

Chinese First Office Action, Chinese Application No. 202210886689.7, dated Sep. 7, 2022 (21 pages).

Notification to Grant Patent Right for Invention, Chinese Application No. 202210886689.7, dated Sep. 27, 2022 (6 pages).

* cited by examiner

Starting up the backlight module, the backlight module is a backlight module provided in the above embodiments. / S10

Detecting the first brightness value at the seam / S20 supplementing the light to the seam based on the detected first brightness value. / S30

DISPLAY DEVICE, BACKLIGHT MODULE AND CONTROL METHOD

CROSS REFERENCE TO RELATED APPLICATIONS

This application claims priority to Chinese Patent Application No. 202210886689.7, filed on Jul. 26, 2022 in the National Intellectual Property Administration of China, the contents of which are herein incorporated by reference in their entireties.

TECHNICAL FIELD

The present disclosure relates to the field of displaying, and in particular to a display device, a backlight module, and a method of controlling the backlight module.

BACKGROUND

As a rising display technology, a mini light emitting diode (LED) has outstanding advantages in viewing angle, luminance, high dynamic imaging (HDR), and the like, and the mini LED becomes more and more popular.

At present, the mini LED is configured as a backlight source and is arranged on a liquid crystal display (LCD) to allow the display to be ultra-thin, display contents highly brightly and to be divided into a plurality of displaying regions. As the number of displaying regions increases, demand for having the plurality of displaying regions increases. Therefore, an active matrix (AM) is proposed.

However, when an AM TFT structure is configured, an external circuit may be bonded in a chip on pi (COP) manner, such that a gap between light-emitting elements located in a splicing region of lamp panels is larger than a gap between the light-emitting elements in the panels. Therefore, a dark region may be generated at a seam, and quality of the backlight module may be affected.

SUMMARY OF THE DISCLOSURE

A display device, a backlight module, and a method of controlling the backlight module may be provided in the present disclosure to solve the problem that quality of light emitting of the backlight module may be impacted due to the dark region being generated at the seam when the gap between light-emitting elements located in the splicing region of lamp panels being larger than the gap between the light-emitting elements in the panels.

According to a first aspect, a backlight module, including:
a lamp panel, including a plurality of light-emitting plates spliced to each other, a seam is generated between two adjacent light-emitting plates of the plurality of light-emitting plates, each of the plurality of light-emitting plates includes a plurality of light-emitting elements; and
a light-guide assembly, arranged at the seam, a height of the light-guide assembly in a direction perpendicular to the lamp panel is greater than a height of each of the plurality of light-emitting elements, a surface of a side of the light-guide assembly away from the plurality of light-emitting plates is recessed toward the seam, and a part of light, which is emitted from any light-emitting element of the plurality of light-emitting elements arranged at edges of the two adjacent light-emitting plates and near the seam, is refracted by the light-guide assembly to propagate towards the seam.

The backlight module further including an optical film, arranged on a side of each of the plurality of light-emitting elements away from the plurality of light-emitting plates;
for each of the plurality of light-emitting plates, the plurality of light-emitting elements include an edge light-emitting element, arranged at an edge the light-emitting plate near the seam;
a height of a highest point of a surface of the recessed portion in the direction perpendicular to the lamp panel is in a range from a first height to a second height, and a height of a lowest point of the surface of the recessed portion is less than a third height;
the first height is a distance from an intersection point to a plane where a surface of the edge light-emitting element away from the optical film is arranged, the intersection point refers to a point that light, which is emitted from an outermost point of a side of the edge emitting element near the light-guide assembly, intersects with a plane where a side surface of the light-guide assembly is arranged;
the second height is a sum of two thirds of a second distance and a thickness of the edge light-emitting element in the direction perpendicular to the lamp panel, the second distance is from a surface of the edge light-emitting element near the optical film to the optical film;
the third height is a distance from a third intersection point to a plane where a surface of the edge light-emitting element away from the optical film is arranged, and the third intersection point refers to a point that a first light intersects with a second light; the first light is originally emitted from the outermost point of the side of the edge light-emitting element, which is arranged on a first light-emitting plate and near the seam, and is refracted by the light-guide assembly; and the second light is originally emitted from the outermost point of the side of the edge light-emitting element, which is arranged on a second light-emitting plate adjacent to the first light-emitting plate and is near the seam, and is refracted by the light-guide assembly.

The surface of the recessed portion includes a first surface and a second surface;
the light-guide assembly includes a first side surface and a second side surface opposite to the first side surface in a width direction of the seam;
an angle between the first surface and the first side surface and/or an angle between the second surface and the second side surface is less than 90 degrees, and an angle between the first side surface and a corresponding light-emitting plate of the plurality of light-emitting plates is less than or equal to 90 degrees, and/or an angle between the second side surface and a corresponding light-emitting plate of the plurality of light-emitting plates is less than or equal to 90 degrees; and
for the two adjacent light-emitting plates, an angle between refracted light and a direction where each of the two adjacent light-emitting plates is arranged is greater than 15 degrees, the refracted light refers to a part of light emitted from the light-emitting element, which is arranged at an edge of either one of the two adjacent light-emitting plates near the seam, and refracted by the light-guide assembly.

The light-guide assembly includes a first body part and a second body part, the first body part is received inside the seam, and the second body part is arranged on a side of the first body part, and the second body part extends along the width direction of the seam to be further arranged on two of the plurality of light-emitting plates disposed at two sides of the seam.

The light-guide assembly extends along an extension direction of the seam, a gap is defined between the first body part and each of the two adjacent light-emitting plates, and a width of the gap is in a range of 0.2 mm to 0.6 mm.

A groove is defined in a surface of the first body part away from the second body part, and the light-guide assembly further includes a light supplementing element, the light supplementing element is received in the groove.

A bottom surface of the groove protrudes towards the second body part.

A light mixing film layer is arranged on the surface of the recessed portion and is configured to mix light that propagates toward and reaches a side of the light-guide assembly away from the seam.

According to a second aspect, a method of controlling the backlight module, including:
- starting up the backlight module described in above embodiments;
- detecting a first brightness value at the seam;
- supplementing light to the seam based on the detected first brightness value.

According to the third aspect, a display device, the display device includes the backlight module described in the above embodiments.

The display device, the backlight module and the method of controlling the backlight module may be provided in the present disclosure. The lamp panel of the backlight module is formed by splicing a plurality of light-emitting plates to provide backlight to the display panel. The light-guide assembly may be arranged at the seam, and the height of the light-guide assembly in a direction perpendicular to the lamp panel is greater than a height of each of the plurality of the light-emitting elements. Therefore, the light-guide assembly may receive a part of the light emitted from the light-emitting elements, which are arranged at edges of two adjacent light-emitting plates near the seam. The surface of the side of the light-guide assembly away from the light-emitting plate is recessed toward the seam, the part of the emitted light received by the light-guide assembly may be refracted by the light-guide assembly and may be output from the surface of the recessed portion, propagating towards the seam. Therefore, the amount of light, which is emitted from the light-emitting elements disposed at the edges of the two adjacent light-emitting plates near the seam and propagates towards the seam, may be increased, such that a light mixing area at the seam may be increased, light may be supplemented to the dark region generated at the seam, the brightness of the seam may be effectively improved, and the brightness difference between the light field of the seam and the light field inside each light-emitting plate may be reduced. Therefore, the backlight module may emit light more evenly, and the quality of the light emitting of the backlight module may be improved.

DETAILED DESCRIPTION

The technical solutions in the embodiments of the present disclosure are clearly and completely described in conjunction with the drawings in the embodiments of the present disclosure. It is obvious that the described embodiments are only a part of the embodiments of the present disclosure, and not all embodiments. All other embodiments acquired by the ordinary skilled in the art based on the embodiments in the present disclosure without the creative work are all within the scope of the present disclosure.

In the description of the present disclosure, it shall be the understood that, terms "first", "second", "third" and the like are used herein for descriptive purposes only, and shall not be interpreted as indicating or implying relative importance or implying the quantity of indicated technical features. In the description of present disclosure, terms "multiple" means at least two, such as two, three, and the like, unless otherwise specified. All directional indications (such as up, down, left, right, front, back, . . . ) in embodiments of the present disclosure are only used to explain the relative positional relationship, movement situation, and the like in a certain posture (as shown in figures). If the specific posture changes, the directional indication will also change accordingly. Furthermore, the terms "including" and "having", and any modification thereof are intended to cover un-exclusive inclusion. For example, a process, method, system, product, or device that includes a series of steps or units is not limited to the listed steps or units, but optionally also includes steps or units not listed, or optionally includes other steps or units inherent to these processes, methods, products, or equipment.

"Embodiment" herein means that a particular feature, structure, or characteristic described with reference to embodiments may be included in at least one embodiment of the present disclosure. The term appearing in various places in the specification are not necessarily as shown in the same embodiment, and are not exclusive or alternative embodiments that are mutually exclusive with other embodiments. Those skilled in the art will understand explicitly and implicitly that the embodiments described herein may be combined with other embodiments.

The present disclosure will be described in detail in the following by referring to specific embodiments.

Figure 1:
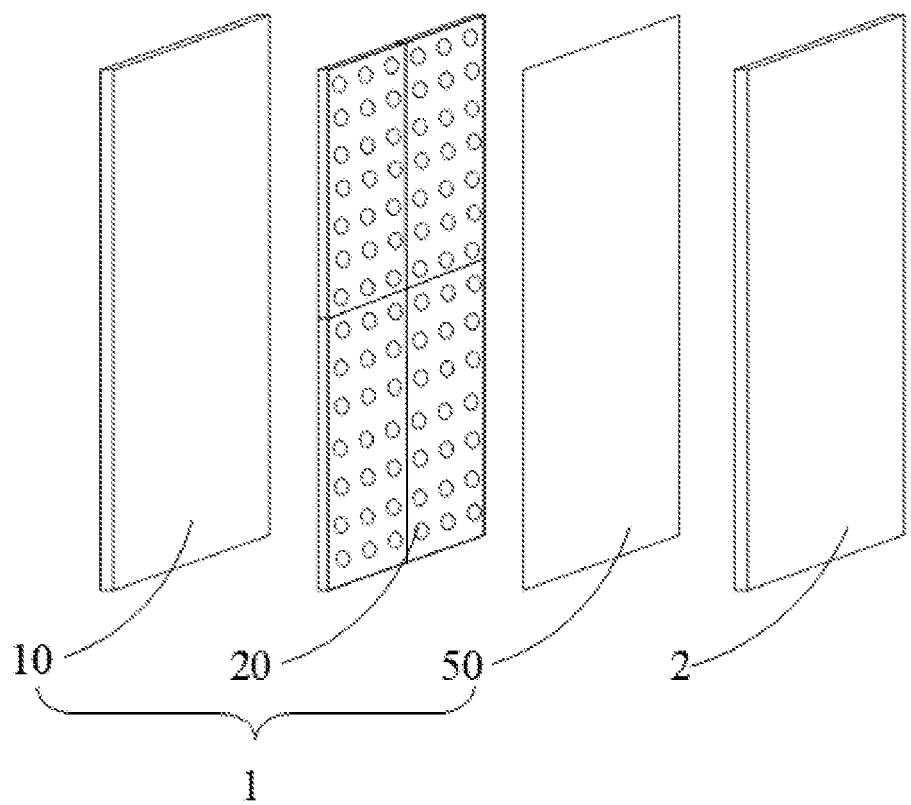
FIG. 1 is a schematic view of a display device according to an embodiment of the present disclosure.
Figure 2:
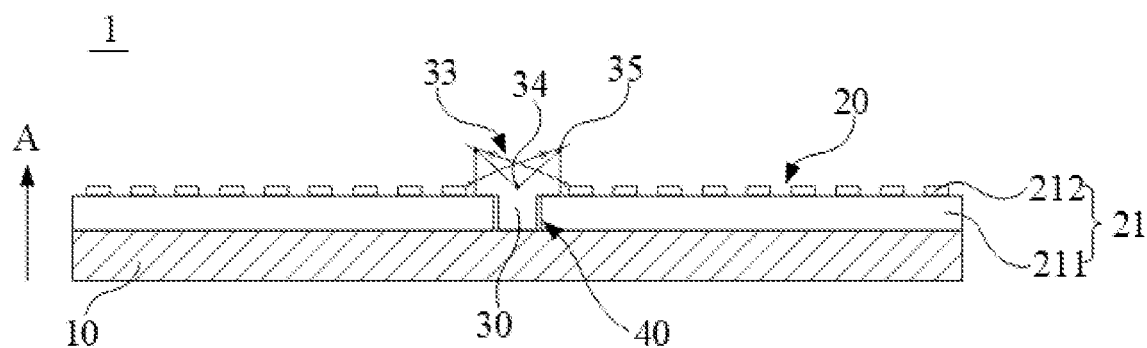
FIG. 2 is a schematic view of a backlight module according to a first embodiment of the present disclosure.

As shown in FIG. 1 and FIG. 2. FIG. 1 is a schematic view of a display device according to an embodiment of the present disclosure. FIG. 2 is a schematic view of a backlight module according to an embodiment of the present disclosure. The present embodiment provides a display device including: a backlight module 1 and a display panel 2. In some embodiments, the display panel 2 may be arranged corresponding to the backlight module 1. In detail, the backlight module 1 may be configured to provide a backlight source to the display panel 2. The display panel 2 may be correspondingly arranged on a side of the backlight module 1 where a light output face is arranged, and configured to receive a backlight and control transmittance of the backlight, such that images having various gray scales may be displayed. In some embodiments, the light output face of the backlight module 1 refers to a surface of a side of the backlight module 1 that emits light. In specific embodiments, the display panel 2 may be a liquid crystal display (LCD) panel 2, and the LCD panel 2 may include an array substrate, a color filter substrate, and a liquid crystal layer arranged between the array substrate and the color filter substrate.

In the present disclosure, the backlight module 1 may include a backplate 10, a lamp panel 20, a light-guide assembly 30, and an optical film 50. The light panel 20 is formed by splicing a plurality of light-emitting plates 21, and each of the plurality of light-emitting plates 21 may include a plurality of light-emitting elements 212. The plurality of light-emitting elements 212 may be arranged in an array. The light-guide assembly 30 may be arranged at a seam 40 between two adjacent light-emitting plates of the plurality of light-emitting plates 21, and may be configured to supplement light to a dark region at the seam 40. Therefore, a brightness difference between a light field at the seam 40 and a light field inside the light-emitting plate 21 may be reduced, the backlight module 1 may emit light more evenly, and quality of light emitting of the backlight module 1 may be improved. In detail, the backplate 10, the lamp panel 20, the optical film 50, and the display panel 2 may be laminated in sequence and assembled to form a display device. The optical film 50 may include but is not limited to a diffuser, a bright enhancement film, and the like. The optical film 50 may be configured to further process backlight provided by the lamp panel 20, such as diffusing the light, mixing the light, and the like, such that the quality of the light emitting of the backlight module 1 may be improved.

In the present disclosure, the backlight module 1 may be provided. The backlight module 1 may include the backplate 10, the lamp panel 20, the light-guide assembly 30, and the optical film 50. The backplate 10 may be configured to support the lamp panel 20, the light-guide assembly, and the optical film 50. The lamp panel 20 may be arranged on a side of the backplate 10, and configured to provide the backlight source. The optical film 50 may be arranged on a side of the lamp panel 20 away from the backplate 10, and may cover the lamp panel 20. The optical film 50 may be configured to mix and homogenize the backlight provided by the lamp panel 20, allowing the backlight module 1 to emit light more evenly.

As shown in FIG. 1 to FIG. 2, in detail, the lamp panel 20 may include a plurality of light-emitting plates 21 spliced to each other. A seam 40 may be defined when two adjacent light-emitting plates 21 are spliced. The plurality of light-emitting plates 21 may be spliced and arranged on the backplate 10. The number of the light-emitting plates 21 may be determined according to a size of the backlight module 1 and a size of each of the plurality of light-emitting plates 21. Further, a manner of splicing the plurality of light-emitting plates 21 may be determined according to the size and a shape of the backlight module 1. Specifically, the plurality of light-emitting plates 21 may be arranged in a single row and a plurality of columns, or in a plurality of rows and a plurality of columns. A specific arrangement may refer to the related art, and will not be described herein.

The light-emitting plate 21 may include a driving substrate 211 and a plurality of light-emitting elements 212. The plurality of light-emitting elements 212 may be arranged on the driving substrate 211 in an array and electrically connected with the driving substrate 211, such that the driving substrate 211 may drive the light-emitting elements 212 to emit light. In detail, each of the plurality of light-emitting elements 212 may include a light emitting diode (LED) or other light emitting devices, such as a Mini LED, a Micro LED, and the like. A size of the Mini LED may be 50 microns to 200 microns, and a size of the Micro LED may be less than 50 microns. Since the Mini LED may be outstanding advantages in viewing angles, brightness, high dynamic imaging (HDR) and other aspects, in the present embodiment, the light emitting element 212 being configured as the Mini LED may be taken as an example for illustration.

A distance between the light-emitting elements 212 located in the splicing region of the lamp panels 20 is larger than a distance between the light-emitting elements 212 located inside one lamp panel 20 due to the presence of the seam 40. That is, a distance between the light-emitting elements 212 located at an edge of one light-emitting plate 21 near the seam 40 and the light-emitting elements 212 located at an edge of an adjacent light-emitting plate 21 near the seam 40 is greater than a distance between two adjacent light-emitting elements 212 located inside one light-emitting plate 21. Therefore, only a small part of light emitted from the light-emitting elements 212, which are disposed at the edges of the two adjacent light-emitting plates 21 near the seam 40, may cover the seam 40, and the dark region may be defined at the seam 40, the quality of the light emitting of the backlight module 1 may be significantly impacted. In order to solve the above technical problems, in the present embodiment, the backlight module 1 may further include the light-guide assembly 30. The light-guide assembly 30 may be arranged at the seam 40. In addition, a height of the light-guide assembly 30, in a direction perpendicular to the lamp panel 20, is greater than a height of each of the plurality of light-emitting elements 212. Further, a surface of a side of the light-guide assembly 30 away from the light-emitting plate 21 may be recessed toward the seam 40, such that a part of the light emitted from the light-emitting elements 212, which are arranged at the edges of the two adjacent light-emitting plates 21 near the seam 40, may be refracted by the light-guide assembly 30 and may propagate toward the seam 40.

In the embodiments, the surface of the light-guide assembly 30 away from the light-emitting plate 21 may be recessed toward the seam 40, forming a recessed portion 33. In the direction perpendicular to the light-emitting plate 21, a level where a highest point 35 of the recessed portion 33 is arranged is higher than a level where a top surface of the light-emitting elements 212 is arranged. The highest point 35 of the recessed portion 33 may be arranged at a top of each of two sides of the recessed portion 33 in a width direction of the seam 40, and the top surface of the light-emitting elements 212 may be a surface of a side of the light-emitting elements 212 away from the driving substrate 211. It should be noted that the above mentioned levels (the level where the highest point 35 of the recessed portion 33 is arranged, and the level where the top surface of the light-emitting elements 212 is arranged) may all take a plane where bottom surfaces of the light-emitting elements 212 are arranged as a reference plane, i.e., a plane where a side of the light-emitting plate 21 near the light-emitting elements 212 is arranged. The bottom surface of the light-emitting element 212 may be a surface opposite to the top surface of the light-emitting element 212. Any height involved in the present disclosure refers to a height relative to the reference plane.

For the backlight module 1 in the present embodiment, the light-guide assembly 30 may be arranged at the seam 40, the surface of the side of the light-guide assembly 30 away from the light-emitting plate 21 is recessed toward the seam 40 to form the recessed portion 33. Further, in the direction perpendicular to the light-emitting plate 21, the level where the highest point 35 of the recessed portion 33 is arranged is higher than the level where the top surface of the light-emitting element 212 is arranged. Therefore, the light-guide assembly 30 may receive a part of the light emitted from the light-emitting elements 212, which are arranged at the edges of the two adjacent light-emitting plates 21 near the seam 40. further, the part of the emitted light received by the light-guide assembly 30 may be refracted by the light-guide assembly 30 and may be output from the surface of the recessed portion 33, propagating towards the seam 40. Therefore, the amount of light, which is emitted from the light-emitting elements 212 disposed at the edges of the two adjacent light-emitting plates 21 near the seam 40 and propagates towards the seam 40, may be increased, such that light may be supplemented to the dark region generated at the seam 40, the brightness of the seam 40 may be effectively improved, and the brightness difference between the light field of the seam 40 and the light field inside each light-emitting plate 21 may be reduced. Therefore, the backlight module 1 may emit light more evenly, and the quality of the light emitting of the backlight module 1 may be improved.

In detail, the light-guide assembly 30 may be made of transparent material, such as one or more of glass, resin, quartz, acrylic, and the like. The material of the light-guide assembly 30 may be determined according to requirements of a refraction rate, transparency, and the like, and will not be limited herein. The material of the light-guide assembly 30 shall allow the light emitted from the light-emitting elements 212 to propagate towards the seam 40 through the light-guide assembly 30, increasing a light mixing area at the seam 40, and improving the brightness of the seam 40.

Figure 3:
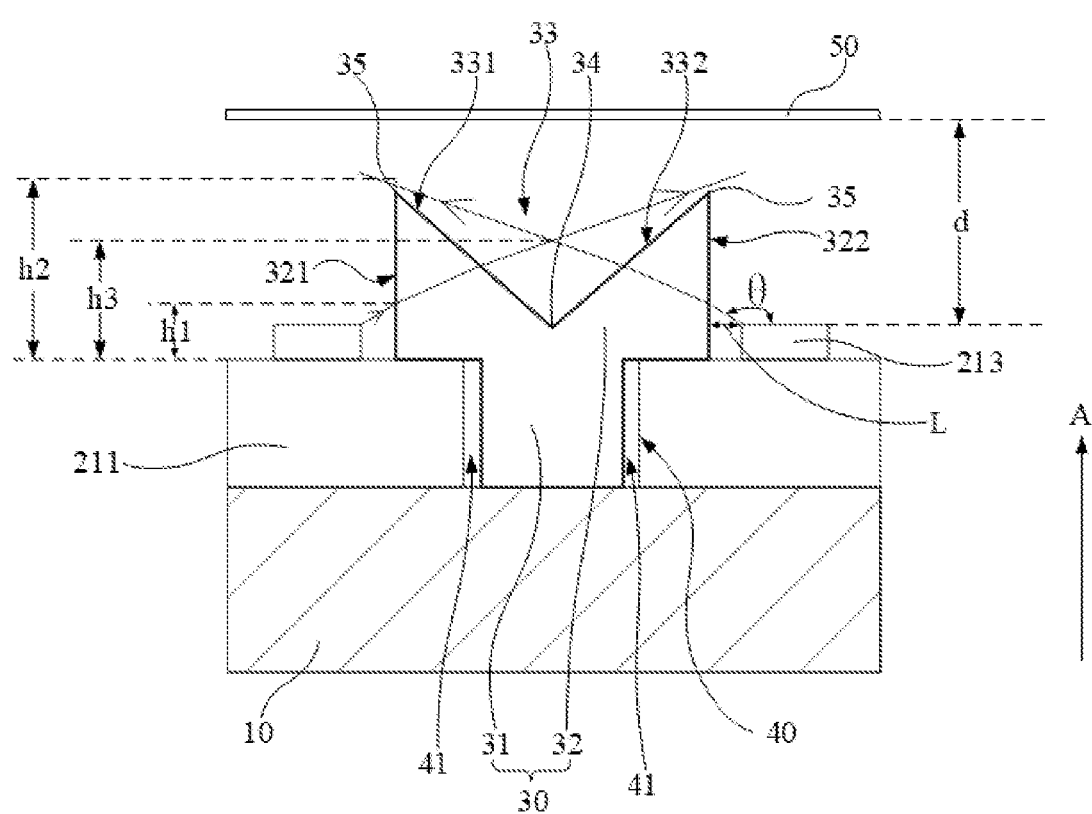
FIG. 3 is a schematic view showing a location relationship between the highest point and the lowest point of the sunk part shown in FIG. 2.

As shown in FIG. 2 and FIG. 3, FIG. 3 is a schematic view showing a location relationship between the highest point and the lowest point of the recessed portion shown in FIG. 2. In the present embodiment, the plurality of light-emitting elements may include an edge light-emitting element 213, and the edge light-emitting element may be arranged at the edge of the light-emitting plate 21 near the seam 40. It should be understood that, a row of light-emitting elements 212, which are arranged on the light-emitting plate 21 and are closest to the seam 40, may be edge light-emitting elements 213. Generally, the edge light-emitting element 213 and the rest light-emitting elements 212 on the light-emitting plate 21 may be in a same type and may have a same size and a same shape. Of course, to meet some special requirements, the edge light-emitting element 213 and the rest light-emitting elements 212 arranged on the light-emitting plate 21 may be in different types. For example, in order to satisfy the demand of supplementing light for the seam 40, a light-emitting element, which may emit more light than the rest light-emitting elements 212 do, may be configured as the edge light-emitting element 213. In this way, the brightness at the seam 40 may be improved, and the edge light-emitting element 213 may be determined according to the specific needs, and will not be limited herein.

As shown in FIG. 3, in the direction A perpendicular to the lamp panel 20, the lever where the highest point 35 of the surface of the recessed portion 33 is arranged may range from a first height h1 to a second height h2. The first height h1 may be defined as a distance from an intersection point to the surface of the light-emitting element 212 away from the optical film 50, where the intersection point refers to a point that light emitted from an outermost point of a side of the edge-emitting element 213 near the light-guide assembly 30 intersects with a plane where a side surface of the light-guide assembly 30 is arranged. That is, the first height h1 is a distance from the intersection point to the reference plane. For ease of understanding, the first height h1 may be expressed by the formula (1):

$$h1 = h_0 + L \cdot \tan(\pi - \theta) \quad (1)$$

The $h_0$ is a height from the top surface of the light-emitting elements 212 to the reference plane, the L is a distance between the side surface of the light-guide assembly 30 and the edge light-emitting element 213 disposed near the side surface of the light-guide assembly 30, and the $\theta$ is a largest output angle of the light emitted from the edge light-emitting element 213, i.e., an angle between the light emitted from the outermost point of the side of the edge-emitting element 213 near the light-guide assembly 30 and the top surface of the edge light-emitting element 213. As shown in formula (1), for a determined edge light-emitting element 213, values of the $h_0$ and the $\theta$ may be fixed. In this case, a value of the h1 is positively correlated with a value of the L, that is, the further the light-guide assembly 30 is distant from the edge light-emitting element 213, the greater the h1 is; and the closer the light-guide assembly 30 is distant from the edge light-emitting element 213, the less h1 is. Therefore, in the present embodiment, a minimum height of the highest point of the light-guide assembly 30 may be regulated by determining the distance between the light-guide assembly 30 and the edge light-emitting element 213. It should be easily understood that, the closer the side surface of the light-guide assembly 30 is distant from the edge light-emitting element 213, the larger the range of the light-guide assembly 30 able to receive the light emitted from the edge light-emitting element 213 is.

The level where the highest point 35 of the surface of the recessed portion 33 is arranged may not be lower than the first height h1, such that the light-guide assembly 30 may receive a part of the light emitted from the edge light-emitting element 213, and the part of the emitted light may be refracted by the light-guide assembly 30 to propagate toward the seam 40. Therefore, the amount of light at the seam 40 may be increased, and the light may be supplemented to the seam 40.

The second height h2 may be defined as a sum of two thirds of a distance and a thickness of the light-emitting element 212 in the direction perpendicular to the lamp panel, the distance is from a surface of the light-emitting element 212 near the optical film 50 to the optical film 50. It should be easily understood that, the thickness of the light-emitting element 212 in the direction perpendicular to the lamp panel is the height $h_0$ from the top surface of the light-emitting element 212 to the reference plane, as described in the above. For ease of understanding, the second height h2 may be expressed as formula (2):

$$h2 = h_0 + \tfrac{2}{3} \cdot d \quad (2)$$

The $h_0$ is the height from the top surface of the light-emitting element 212 to the reference plane, and the d is the distance from the top surface of the light-emitting element 212 to the optical film 50. As shown in formula (2), a maximum value of the highest point 35 of the surface of the recessed portion 33 may be less than the height from the optical film 50 to the reference plane, and there is a certain distance between the highest point 35 of the surface of the recessed portion 33 and the optical film 50. Therefore, while the backlight module 1 may be light and thin, the light-guiding assembly 30 may not be excessively high, such that a path of the part of the light emitted from the edge-emitting element 213 may not be blocked, and brightness of the light field of the optical film 50 may be uniform.

It should be noted that, the level where the highest point 35 of the surface of the recessed portion 33 may be lower than a forth height (not shown), and the forth height may be defined as a distance from another intersection point to the reference plane, the another intersection point refers to refracted light (refracted by the light-guide assembly 30) of the light emitted from the outermost point of the side of the edge-emitting element 213 near the seam 40 intersecting with a plane where the side surface of the light-guide assembly 30 is arranged. In this way, the part of the emitted light, which is received by the light-guide assembly 30, may emit out from the surface of the recessed portion 33 after being refracted by the light-guide assembly 30 and may directly emit to the optical film 50 of the backlight module 1. Therefore, the highest point 35 of the recessed portion 33 may not block the light emitted from the surface of the recessed portion 33, and this part of the light may emit directly to the optical film 50 disposed above the seam 40, and the light-guide assembly 30 may have an improved effect in supplementing light to the dark region at the seam 40.

Furthermore, in the present embodiment, the level where a lowest point 34 of the surface of the recessed portion 33 may be lower than a third height h3. The third height h3 is a distance from a third intersection point to a plane where a surface of the light-emitting element 212 away from the optical film is arranged. The third intersection point refers to a point that a first light intersects with a second light. The first is emitted from the outermost point of a side of the edge light-emitting element 213, which is arranged on a first light-emitting plate 21 and near the seam 40, and is refracted by the light-guide assembly 30. The second light is emitted from the outermost point of a side of the edge light-emitting element 213, which is arranged on a second light-emitting plate 21 adjacent to the first light-emitting plate 21 and is near the seam 40, and is refracted by the light-guide assembly 30. That is, the third distance is the distance from the third intersection point to the reference plane. In the present embodiment, in the direction perpendicular to the light-emitting plate 21, the level where the lowest point 34 of the recessed portion 33 is arranged is lower than the third height h3, such that the part of the emitted light received by the light-guide assembly 30 may be refracted by the light-guide assembly 30 and may emit from a part of the surface of the recessed portion 33 near the output light. In this way, the part of the light received by the light-guide assembly 30 may be emitted from the light-guide assembly 30, a refraction path of the part of the light inside the light-guide assembly 30 may not be excessively long, light intensity may not be attenuated, and the brightness at the seam may not be reduced.

In the present embodiment, the light-guide assembly 30 may include a first body part 31 and a second body part 32. The first body part 31 may be received inside the seam 40. The second body part 32 may be arranged on a side of the first body part 31 away from the backplate 10, and may be arranged directly above the seam 40 and connected to the first body part 31. The second body part 32 extends along the width direction of the seam 40 to be further arranged on two light-emitting plates 21 disposed on two sides of the seam 40. That is, edges of the two adjacent light-emitting plates 21 disposed on the two sides of the seam 40 near the seam 40 may be arranged between the backplate 10 and the second body part 32. In detail, the second body part 32 may be attached to a top surface of each of the edges of the two adjacent light-emitting plates 21 near the seam 40 to limit positions of the edges of the light-emitting plates 21 near the seam 40 in the direction perpendicular to prevent the edges of the light-emitting plates 21 from warping.

It should be noted that, in the present embodiment, the second body part 32 may include a first side surface 321 and a second side surface 322 opposite to the first side surface 321 in the width direction of the seam 40. In the above embodiments, any side surface of the light-guide assembly 30 involved in the first height h1, the second height h2 and the third height h3 may be the first side surface 321 and/or the second side surface 322 of the second body part 32 that are oppositely arranged in the width direction of the seam 40. Further, any side surface of the light-guide assembly 30 in the following embodiments may be the first side surface 321 and/or the second side surface 322 of the second body part 32.

Furthermore, a gap 41 may be defined between the first body part 31 and each of the two adjacent light-emitting plates 21. A width of the gap 41 may be in a range of 0.2 mm to 0.6 mm. It should be understood that, the first body part 31 may be received in the seam 40 between the two light-emitting plates 21. The light-emitting plate 21 may usually be made of elastic. When the backlight module 1 is operating for a long period of time, the light-emitting elements 212 may emit light for a long period of time, such that the driving substrate 211 attached to the light-emitting elements 212 may easily be heated, and the driving substrate 211 may be expanded to a certain extent due to the material of the driving substrate 211. In this way, the width of the seam 40 between the two adjacent light-emitting plates 21 may be reduced. Therefore, the gap 41 with a certain width may be defined between the first body part 31 and each of the two adjacent light-emitting plates 21, such that the lamp panel 20 and the light-guide assembly 30 may not be compressed with each other, even when the lamp panel 20 expands. Therefore, the light-guide assembly 30 or the light-emitting plate 21 may not have wrinkles, breakages or may not be warping, performance of the backlight module may be improved, and stability of quality of the backlight module 1 may be ensured. It should be understood that, an assembling error or a production error may occur, and therefore, a width of the gap 41 between one side of the first body part 31 and a corresponding one of the two adjacent light-emitting plates 21 may be different from a width of the gap 41 between the other side of the first body part 31 and the other corresponding one of the two adjacent light-emitting plates 21. In the present embodiment, the width of the gap 41 between one side of the first body part 31 and the corresponding one of the two adjacent light-emitting plates 21 and the width of the gap 41 between the other side of the first body part 31 and the other corresponding one of the two adjacent light-emitting plates 21 may be approximately 0.3 mm, generally not less than 0.2 mm and not more than 0.3 mm. When no gap 41 is defined between one side of the first body part 31 and the corresponding one of the two adjacent light-emitting plates 21, the gap 41 between the other side of the first body part 31 and the other corresponding one of the two adjacent light-emitting plates 2 may not be less than 0.4 mm and not greater than 0.6 mm. A width range of the gap 41 between the first body part 31 and the corresponding one of the two adjacent light-emitting plates 21 may be from 0.2 mm to 0.6 mm to reserve a sufficient space for the heating expansion of the light emitting plate 21. In this way, when the light emitting plate 21 is expanded due to being heated, the light emitting plate 21 and the light-guide assembly 30 may not be compressed to each other, such that wrinkles, breakages or warping of the light emitting plate 21 may not be caused, the performance of the product may be improved, and the stability of the quality of the backlight module 1 may be ensured.

Furthermore, in specific embodiments, an angle range of the light, which is emitted from the light-emitting element 212 and is received by the light-guide assembly 30, may be regulated by determining a distance between the side surface of the second body part 32 (first side surface 321 and/or the second side surface 322) and the light-emitting element 212 that is arranged on the light-emitting plate 21 and is near the second body part 32. It should easily be understood that, the less the distance between the side surface of the second body part 32 and the light-emitting element 212 of the light-emitting plate 21 near the second body part 32, the larger the angle range of the light that is emitted from the light-emitting element 212 and is received by the light-guide assembly 30, and the better the light supplementing effect being applied to the seam 40. However, it should be noted that, a certain distance need to be reserved between the side surface of the second body part 32 (first side surface 321 and/or the second side surface 322) and the light-emitting element 212 of the light-emitting plate 21 near the second body part 32. In this way, when the light-emitting plate 21 expands due to being heated, the second body part 32 and the light-emitting element 212 disposed near the second body part 32 may be compressed with each other, and the light-emitting element 212 may not be damaged.

In the present embodiments, the first body part 31 and the second body part 32 may be integrally formed or fixedly connected with each other, which may be determined according to the actual requirements and will not be limited herein. The first body part 31 and the second body part 32 may be fixed on the backplate 10 by means of bonding, screw fixation, clamping, which will not be limited herein. The connection manner may be determined according to the specific situation. Of course, in some embodiments, the light-guide assembly 30 may not be provided with first body part 31, and the second body part 32 may directly be arranged above the seam 40 to supplement the light for the seam 40.

In the present embodiments, the surface of the recessed portion 33 of the light-guide assembly 30 may include a first surface 331 and a second surface 332. The light-guide assembly 30 may include a first side surface 321 and a second side surface 322 opposite to the first side surface 321 in the width direction of the seam 40. It should be noted that, the first side surface 321 and the second side surface 322 may be the first side surface 321 and the second side surface 322 of the second body part 32 in the width direction of the seam 40. In detail, the first side surface 321 may be connected to a side of the first surface 331, the other side of the first surface 331 may be connected to a side of the second surface 332, and the other side of the second surface 332 may be connected to the second side surface 322. A junction at which the first surface 331 is connected with the second surface 332 may be recessed downward. Therefore, in the direction perpendicular to the light-emitting plate 21, a height of the first surface 331 may be gradually reduced in a direction approaching the second surface 332, and a height of the second surface 332 may be gradually reduced in a direction approaching the first surface 331, such that the above mentioned recessed portion 33 may be formed. The highest point 35 of the surface of the recessed portion 33 may be arranged at the point where the first side surface 321 is connected to the first surface 331, and/or arranged at the point where the second side surface 322 is connected to the second side surface 322. The lowest point 34 of the surface of the recessed portion 33 may be arranged at the point where the first side surface 331 is connected to the second surface 332. It should be understood that, a cross section of the light-guide assembly 30 along the width direction of the seam 40 may be in a shape of "M". It should be understood that, the height of the first surface 331 may be gradually reduced in the direction approaching the second surface 332, and the height of the second surface 332 may be gradually reduced in the direction approaching the first surface 331. Each of the first surface 331 and/or second surface 332 may be an inclined plane, a concave curved surface, a convex curved surface, or a continuously-folded surface. A shape of the first surface 331 and a shape of the second surface 332 may be determined according to the actual requirements, and will not be limited herein.

Figure 4:
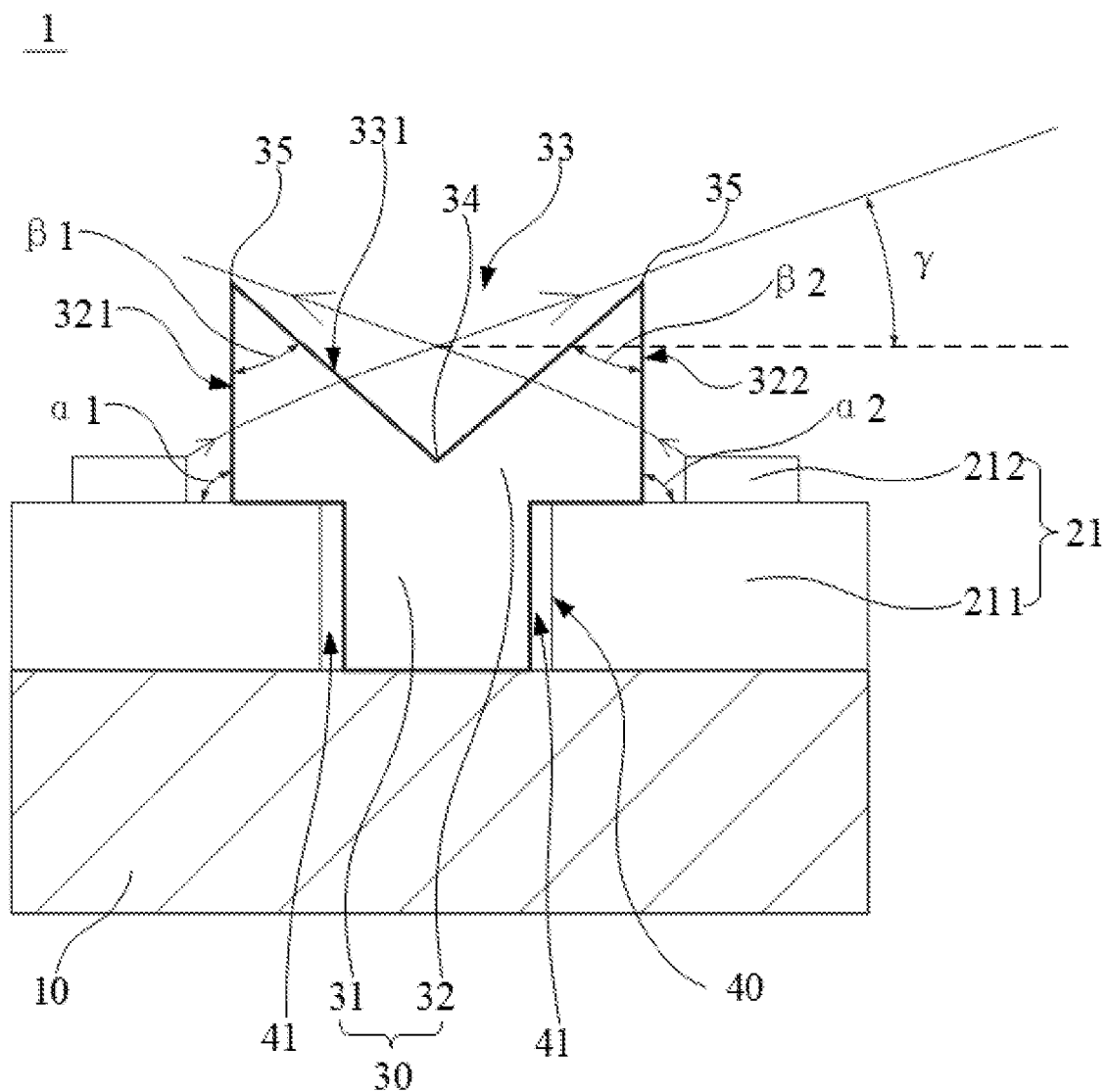
FIG. 4 is a schematic view showing each angle of the light-guide assembly of the backlight module shown in FIG. 2.
Figure 5:
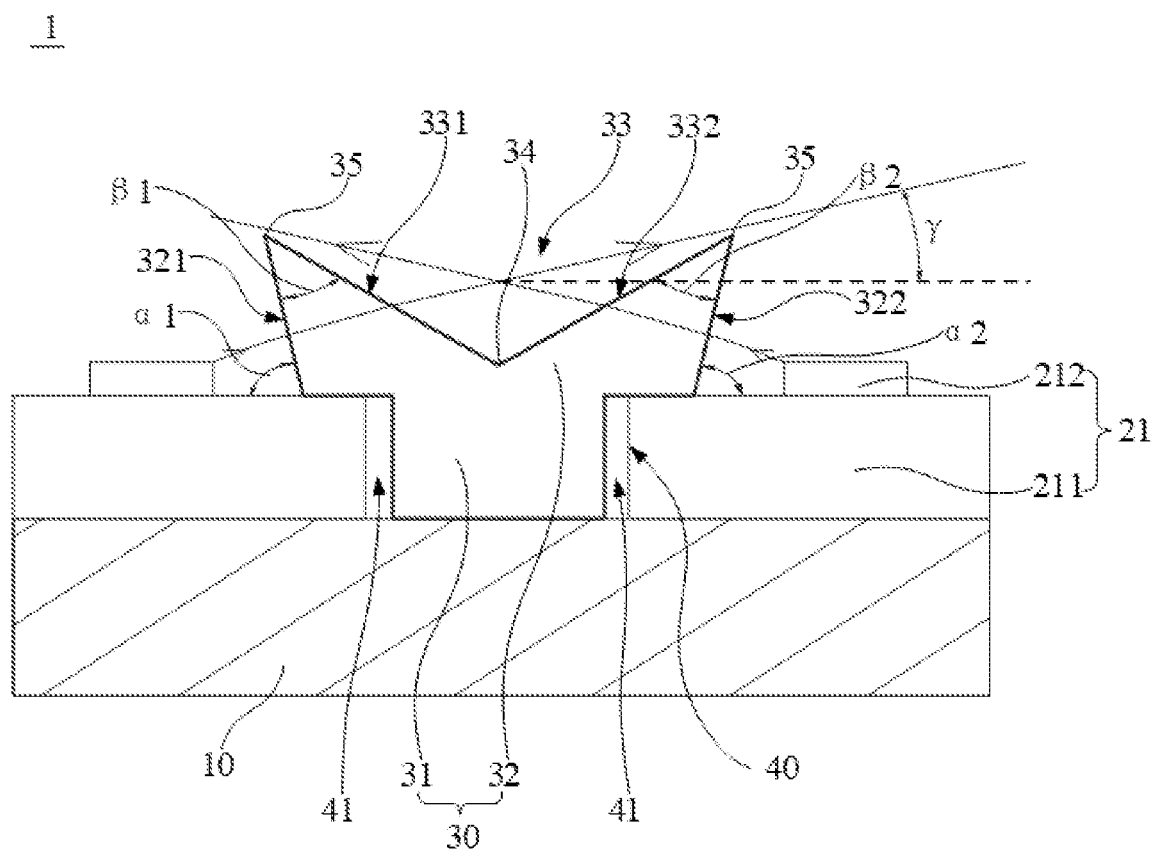
FIG. 5 is a schematic view showing each angle of the light-guide assembly according to a second embodiment of the present disclosure.

As shown in FIG. 4 and FIG. 5, FIG. 4 is a schematic view showing each angles of the light-guide assembly of the backlight module shown in FIG. 2, and FIG. 5 is a schematic view showing each angles of the light-guide assembly according to a second embodiment of the present disclosure. An angle $\beta_1$ between the first surface 331 and the first side surface 321 and/or an angle $\beta_2$ between the second surface 332 and the second side surface 322 may be less than 90 degrees. An angle $\alpha 1$ between the first side surface 321 and a corresponding light-emitting plate 21 may be less than or equal to 90 degrees, and/or an angle $\alpha_2$ between the second side surface 322 and a corresponding light-emitting plate 21 may be less than or equal to 90 degrees. Therefore, an angle $\gamma$ between refracted light and a direction where the light emitting plate 21 is arranged may be greater than 15 degrees, the refracted light refers to light emitted from the outermost points of the sides of the light-emitting elements 212, which are arranged at the edges of two adjacent light-emitting plates 21 near the seam 40, and refracted by the light-guide assembly 30. That is, the angle $\beta_1$ between the first surface 331 and the first side surface 321 and/or the angle $\beta_2$ between the second surface 332 and the second side surface 322 may be determined to regulate refraction paths and refraction angles of the parts of the light, which is emitted from the light-emitting elements 212 that are arranged on the two adjacent light-emitting plates 21 and are near the seam 40, in the light-guide assembly 30. In this way, the angle $\gamma$ between refracted light and a direction where the light emitting plate 21 is arranged may be greater than 15 degrees, the refracted light refers to light emitted from the outermost points of the sides of the light-emitting elements 212, which are arranged at the edges of two adjacent light-emitting plates 21 near the seam 40, and refracted by the light-guide assembly 30, such that a better light supplementing effect on the seam 40 may be achieved. Therefore, a refraction angle of the light refracted by the light-guide assembly 30 may not be excessively large, and the light above the seam 40 may not be excessively spread, i.e., the light may not excessively deviate from a direct upper part of the backplate 10, and the light supplementing effect at the seam 40 may not be affected. In addition, the angle $\alpha_1$ between the first side surface 321 and corresponding light-emitting plate 21, and/or the angle $\alpha_2$ between the second side surface 322 and corresponding light-emitting plate 21 may be determined, that is, the angle $\alpha_1$ between the first side surface 321 and light-emitting plate 21 that is intersected with the first side surface 321, and/or the angle $\alpha_2$ between the second side surface 322 and the light-emitting plate 21 that is intersected with the first side surface 321 may be determined, such that the refraction paths and refraction angles of the part of the light, which is emitted from the light-emitting elements 212 arranged at the edges of the two adjacent light-emitting plates 21 and near the seam 40, in the light-guide assembly 30 may be regulated, and the better light supplementing effect on the seam 40 may be achieved. Therefore, the refraction angle of the light refracted by the light-guide assembly 30 may not be excessively large, and the light above the seam 40 will not be excessively spread, such that the light supplementing effect on the seam 40 may not be affected.

As shown in FIG. 4, in the present embodiment, the angle $\alpha_1$ between the first side surface 321 and the corresponding light-emitting plate 21 may be equal to 90 degrees, and the angle $\alpha_2$ between the second side surface 332 and the corresponding light-emitting plate 21 may be equal to 90 degrees. That is, each the first side surface 321 and the second side surface 322 may be perpendicular to a corresponding lamp panel 20 respectively. The angle $\beta_1$ between the first surface 331 and the first side surface 321 and/or the angle $\beta_2$ between the second surface 332 and the second side surface 322 may be determined to regulate the refraction paths and refraction angles of the part of the light, which is emitted from the light-emitting elements 212 that are arranged at the edges of the two adjacent light-emitting plates 21 and near the seam 40, in the light-guide assembly 30. Therefore, the angle γ between refracted light and a direction where the light emitting plate 21 is arranged may be greater than 15 degrees, the refracted light refers to a part of the light emitted from the light-emitting elements 212, which are arranged at the edges of two adjacent light-emitting plates 21 near the seam 40, and refracted by the light-guide assembly 30, such that a better light supplementing effect on the seam 40 may be achieved. Therefore, a refraction angle of the light refracted by the light-guide assembly 30 may not be excessively large, and the light above the seam 40 may not be excessively spread, i.e., the light may not excessively deviate from a direct upper part of the backplate 10, and the light supplementing effect at the seam 40 may not be affected. In detail, the angle $\beta_1$ between the first surface 331 and the first side surface 321 and/or the included angle $\beta_2$ between the second surface 332 and the second side surface 322 may be determined according to the actual requirements, as long as the above conditions may be met and the actual requirements may be met, and will not be limited herein. The angle $\beta_1$ between the first surface 331 and the first side surface 321 may be equal to the angle $\beta_2$ between the second surface 332 and the second side surface 322, such that a light angle of the part of the light, which is emitted from the light-emitting element 212 arranged at the edge of one light-emitting plate 21 and near the seam 40, after being refracted by the light-guide assembly 30 may be symmetrical with a light angle of the part of the light, which is emitted from the light-emitting element 212 arranged at the edge of the adjacent light-emitting plate 21 and near the seam 40, after being refracted by the light-guide assembly 30. That is, refraction of the light, which is emitted from the two adjacent light-emitting plates 21 and refracted by the light-guide assembly 30, towards the seam 40 may be relatively consistent, and the light mixing region may be highly concentrated at the seam 40. The light mixing region may not be deviated from the seam 40, and the light supplementing effect may not be affected.

As shown in FIG. 5, in the present embodiment, the angle $\alpha_1$ between the first side surface 321 and the corresponding light-emitting plate 21 may be less than 90 degrees, and the angle $\alpha_2$ between the second side surface 332 and the corresponding light-emitting plate 21 may be less than 90 degrees. The angle $\alpha_1$ between the first side surface 331 and the corresponding light-emitting plate 21 and/or the angle $\beta_2$ between the second side surface 332 and the corresponding light-emitting plate 21 may be determined, that is, the angle $\alpha_1$ between the first side surface 321 and the light-emitting plate 21 intersected with the first side surface 321, and/or the angle $\alpha_2$ between the second side surface 322 and the light-emitting plate 21 intersected with the first side surface 321 may be determined, such that the refraction paths and refraction angles of the part of the light, which is emitted from the light-emitting elements 212 that are arranged on the two adjacent light-emitting plates 21 and near the seam 40, in the light-guide assembly 30 may be regulated. In this way, the angle γ between refracted light and the direction where the light emitting plate 21 is arranged may be greater than 15 degrees, the refracted light refers to light emitted from the outermost points of the sides of the light-emitting elements 212, which are arranged at the edges of two adjacent light-emitting plates 21 near the seam 40, and refracted by the light-guide assembly 30, such that a better light supplementing effect on the seam 40 may be achieved. In this way, the refraction angle of the light refracted by the light-guide assembly 30 may not be excessively large, and the light above the seam 40 may not be excessively spread, and the light supplementing effect at the seam 40 may not be reduced. In addition, the angle $\beta_1$ between the first surface 331 and the first side surface 321 and/or the angle $\beta_2$ between the second surface 332 and the second side surface 322 may be determined to regulate the refraction paths and the refraction angles of the part of the light, which is emitted from the light-emitting elements 212 arranged on the two adjacent light-emitting plates 21 and near the seam 40, in the light-guide assembly 30 to achieve the better light supplementing effect on the seam 40. In this way, the refraction angle of the light refracted by the light-guide assembly 30 may not be excessively large, and the light above the seam 40 may not be excessively spread, and the light supplementing effect at the seam 40 may not be reduced. In detail, the angle $\alpha_1$ between the first side surface 321 and corresponding light-emitting plate 21, the included angle $\alpha_2$ between the second side surface 332 and the corresponding light-emitting plate 21, the angle β1 between the first surface 331 and the first side surface 321, and the angle β2 between the second surface 332 and the second side surface 322 may be determined according to the actual requirements, as long as the above conditions may be satisfied and the actual requirements may be achieved, which will not be limited herein. In detail, the angle $\beta_1$ between the first surface 331 and the first side surface 321 may be equal to the angle $\beta_2$ between the second surface 332 and the second side surface 322, and the angle $\alpha_1$ between the first side surface 321 and corresponding light-emitting plate 21 may be equal to the angle $\alpha_2$ between the second side surface 332 and the corresponding light-emitting plate 21. Therefore, the light angle of the part of the light, which is emitted from the light-emitting element 212 arranged at the edge of one light-emitting plate 21 and near the seam 40, after being refracted by the light-guide assembly 30 may be symmetrical with the light angle of the part of the light, which is emitted from the light-emitting element 212 arranged at the edge of the adjacent light-emitting plate 21 and near the seam 40, after being refracted by the light-guide assembly 30. That is, refraction of the light, which is emitted from the two adjacent light-emitting plates 21 and refracted by the light-guide assembly 30, towards the seam 40 may be relatively consistent, and the light mixing region may be highly concentrated at the seam 40. The light mixing region may not be deviated from the seam 40, and the light supplementing effect may not be affected.

Figures 6, 7:
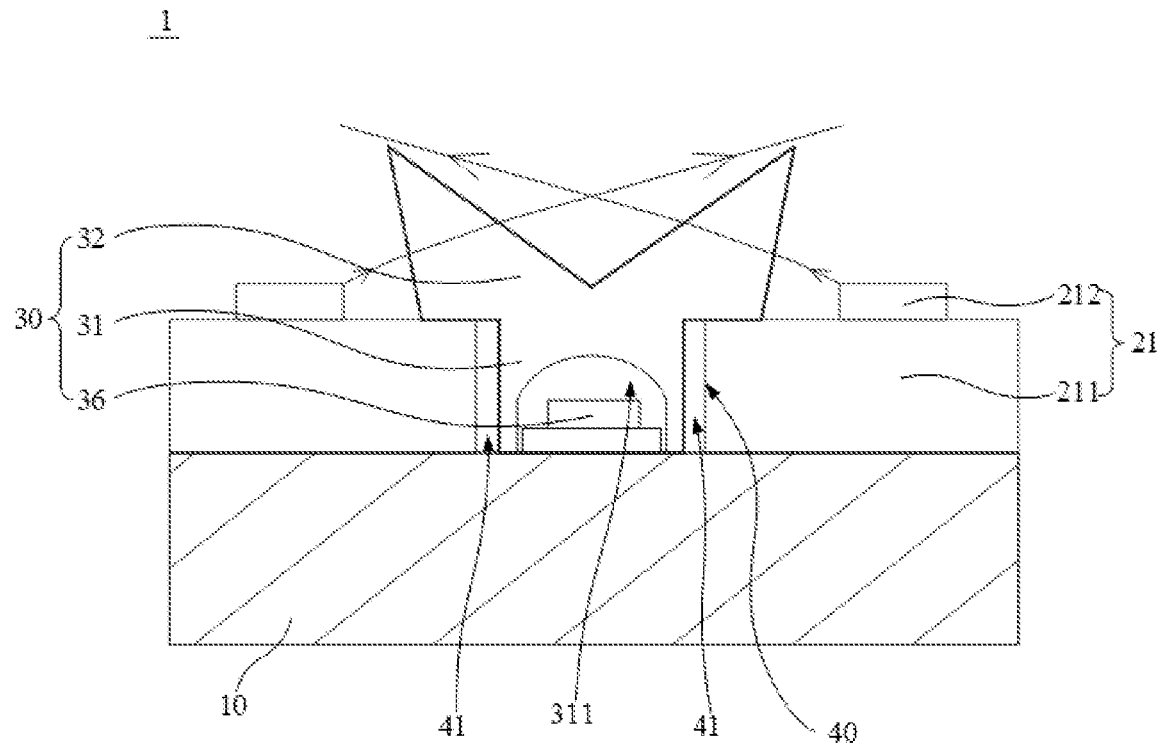
FIG. 6 is a schematic view of a backlight module according to a third embodiment of the present disclosure.
FIG. 7 is a flow chart of a method of controlling a backlight module according to an embodiment of the present disclosure.

As shown in FIG. 6, FIG. 6 is a schematic view of a backlight module according to a third embodiment of the present disclosure. In the present embodiment, the function and the specific structure of the first body part 31 of the light-guide assembly 30 may be same or similar to the function and the specific structure of the first body part 31 described in the above embodiments, and the same technical effects may be achieved, the details may be shown in above description. In the present embodiment, a groove 311 may be defined in a surface of the first body part 31 away from the second body part 32, that is, the groove 311 may be defined in a surface of the first body part 31 near the backplate 10, and a chamber may be defined in the first body part 31. Furthermore, the light-guide assembly 30 may include a light supplementing element 36, which may be received in the groove 311. It should be understood that, the light supplementing element 36 may be received in the seam 40 and arranged below the second body part 32. The light supplementing element 36 may be a LED or other light-emitting element, such as a Mini LED, a Micro LED and so on, which may be determined according to the actual requirements, and will not be limited herein.

When the amount of light supplementing from the second body part 32 to the seam 40 is insufficient, the light supplementing element 36 may be switched on to further supplement light to the seam 40, and the dark region at the seam 40 may further be avoided. The light supplementing element 36 may be switched off when the amount of light supplemented to the seam 40 by the second body part 32 is ideal, such that the light-guide assembly 30 may not supplement excessive amount of light to the seam 40, the seam 40 may not be excessively bright, and the brightness of the backlight module 1 may not be uneven.

Furthermore, the bottom surface of the groove 311 may protrude towards the second body part 32, and the bottom surface of the groove 311 may be arc-shaped. Therefore, the light-guide assembly 30 may be served as a concave lens, such that the light emitted from the light supplementing element 36 may be refracted by the first body part 31 and the second body part 32, and propagate towards two sides of a center of the seam 40. In this way, a range of the emitted light may cover the seam 40 evenly to supplement the light to the seam 40 for a second time, the light emitted from the light supplementing element 36 may not be concentrated excessively at the center of the seam 40, and the light field at the seam 40 may be balanced enough.

It should be easily understood that, the backlight module 1 may include a detecting unit (not shown) and a control unit (not shown). The detecting unit may be electrically connect to the control power supply, and the light supplementing element 36 may be electrically connect to the control unit. The detecting unit may include a first sensor and a second sensor. The first sensor may be configured to detect the brightness value at the seam 40 and the brightness value may be transmitted to the control unit. The second sensor may be configured to detect the brightness value of the light-emitting element 212 at the edge of the light-emitting plate 21 near the seam 40 and the brightness value may be transmitted to the control unit. The difference between the brightness value transmitted by the first sensor and the second sensor may be controlled, and switching on and switching off the light supplementing element 36 may be controlled. Furthermore, the brightness of the light supplementing element 36 may be controlled by the control unit according to the difference value of the brightness value to supplement the light for the seam 40 for second times.

It should be noted that, in the above embodiments, the light-guide assembly 30 may extend along the extension direction of the seam 40 to cover the seam 40. The light-guide assembly 30 may supplement light for all parts of the seam 40. The brightness of the entire seam 40 may be effectively improved, and uneven brightness across the entire seam 40 may be reduced. Therefore, the backlight module 1 may emit light more evenly, and the quality of the light emitting of the backlight module 1 may be improved.

Furthermore, in the above embodiments, a light mixing film layer may be arranged on the surface of the recessed portion 33 of the light-guide assembly 30, and the emitted light, which is refracted by the light-guide assembly 30, may be diffused and mixed by the light-guide assembly in advance, and the phenomenon of backlight color difference caused by separation of different wavelengths of the emitted light due to the refraction by the light-guide assembly 30 may be avoided. At the same time, the balance of the light field at the seam 40 may be improved by diffusing and mixing the emitted light, which is refracted by the light-guide assembly 30 in advance, and the brightness difference may be avoided, the quality of the light emitting of the backlight module 1 may be improved.

The method of controlling the backlight module 1 is shown in FIG. 7, FIG. 7 is a flow chart of a control method of a backlight module according to an embodiment of the present disclosure. In the present embodiments, the control method of the backlight module 1 may include the following operations.

In an operation S10, the backlight module 1 may be started up, the backlight module 1 is a backlight module provided in the above embodiments.

In an operation S20, the first brightness value of the seam 40 may be detected.

In an operation S30, the light may be supplemented to the seam 40 based on the detected first brightness value.

In some embodiments, the backlight module 1 may provide the electrical signal to the driving substrate 211 of the light-emitting plate 21, and the light-emitting plate 21 may be switched on, and the light-emitting element may emit light to provide the backlight. In some embodiments, the function and the specific structure of the first body part 31 of the backlight module 1 may be same as or similar to the function and the specific structure of the backlight module 1 described in the above embodiments, and the same technical effect may be achieved. The details may be shown in above description, and will not be repeatedly described herein.

In some embodiments, the first brightness value of the seam 40 may be detected by the first sensor, and the first brightness value may be transmitted to the control unit. The operation S20 may include the operation of detecting the second brightness value of the light-emitting element 212, which is arranged at the edge of the light-emitting plate 21 near the seam 40. The second sensor may be configured to detect the second brightness value of the light-emitting element 212, which is arranged at the edge of the light-emitting plate 21 near the seam 40, and the second brightness value may be transmitted to the control unit. The first sensor and the second sensor are sensors that may detect brightness value, and the types and models of the sensors may be selected according to the actual requirements, and will not be limited herein.

Figure 8:
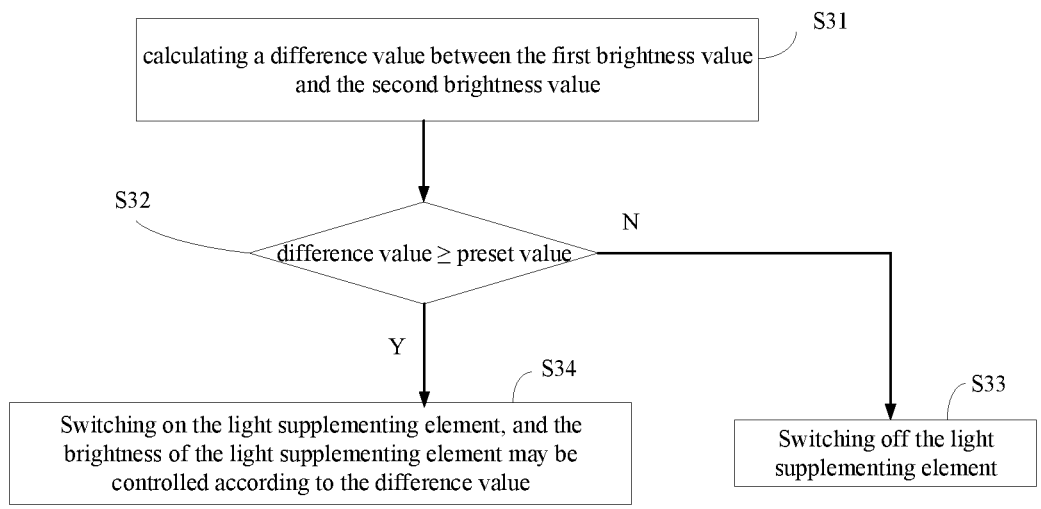
FIG. 8 is a flow chart of a method of an implementation mode of an operation 30 shown in FIG. 7.

As shown in FIG. 8, FIG. 8 is a flow chart of a method of an implementation mode of an operation 30 shown in FIG. 7. In the present embodiments, the operation S30 may include following operations.

In an operation S31, a difference value between the first brightness value and the second brightness value may be calculated.

In an operation S32, the difference value between the first brightness value and the second brightness value may be compared with the preset value, the operation S33 may be proceeded when the difference value is less than or equal to the preset value, and the operation S34 may be proceeded when the difference value is larger than the preset value.

In an operation S33, the light supplementing element 36 may be switched off.

In an operation S34, the light supplementing element 36 may be switched on, and the brightness value of the light supplementing element 36 may be controlled according to the difference value.

In the present embodiments, the first brightness value and the second brightness value may be compared to each other, that is, the brightness value of the seam 40 and the brightness value of the edge of the light-emitting plate 21 near the seam 40 may be compared. When the difference value of the brightness value is less than or equal to the preset value, the brightness difference between the seam 40 and the light-emitting plate 21 may be small. The light field of the backlight module 1 may be uniformly, the light supplement for a second time at the seam 40 may not be needed, and the light supplementing element 36 may be switched off. When the difference value of the brightness value is greater than the preset value, the brightness difference between the seam 40 and the light-emitting plate 21 may be large, and the light at the seam 40 is low at this time, and the light supplementing element 36 may be switched on to supplement the light to the seam 40 for a second time to reduce the brightness difference. Furthermore, the brightness value of the light supplementing element 36 may be controlled by the control unit according to the difference value between the first light value and the second brightness value. In detail, The brightness value of the light supplementing element 36 is proportional to the absolute value of the difference value, that is, the larger the difference value between the first brightness value and the second brightness value, the darker the seam 40 is, and the larger the difference value of the light supplementing element 36 to supplement the light more finely to the seam 40.

Furthermore, in the present embodiments, the preset value may be determined to regulate the light supplement precision of the light-guide assembly 30, and the fine light supplement to the seam 40 may be achieved. Therefore, the brightness difference between the seam 40 and the light-emitting plate 21 may be reduced, and the balance of the overall light field of the backlight module 1 may be improved. Furthermore, the detecting unit may detect the brightness value of the seam 40 and the brightness value of the edge of the light-emitting plate 21 near the seam 40 real-time online, and the detected brightness value may be transmitted to the control unit in real time, and the detecting unit may achieve the real-time online regulation on the light supplementing element 36. The light supplementing effect of the light-guide assembly 30 on the seam 40 may be improved, and the quality of the light emitting of the backlight module 1 may be improved.

The embodiments disclosed above are exemplary only and shall not be interpreted as limiting the scope of the embodiments of the present disclosure. Therefore, any equivalent structure or equivalent process modification used according to the contents of the specification and accompanying drawings in the present disclosure, no matter whether it is directly or indirectly used in any other related technical field, should be included within the protection scope of the present disclosure.

What is claimed is:

1. A backlight module, comprising:
   a lamp panel, comprising a plurality of light-emitting plates spliced to each other, wherein a seam is generated between two adjacent light-emitting plates of the plurality of light-emitting plates, each of the plurality of light-emitting plates comprises a plurality of light-emitting elements; and
   a light-guide assembly, arranged at the seam, wherein a height of the light-guide assembly in a direction perpendicular to the lamp panel is greater than a height of each of the plurality of light-emitting elements, a surface of a side of the light-guide assembly away from the plurality of light-emitting plates is recessed toward the seam, and a part of light, which is emitted from any light-emitting element of the plurality of light-emitting elements arranged at edges of the two adjacent light-emitting plates and near the seam, is refracted by the light-guide assembly to propagate towards the seam; and
   an optical film, arranged on a side of each of the plurality of light-emitting elements away from the plurality of light-emitting plates;
   wherein for each of the plurality of light-emitting plates, the plurality of light-emitting elements comprise an edge light-emitting element, arranged at an edge the light-emitting plate near the seam;
   a height of a highest point of a surface of the recessed portion in the direction perpendicular to the lamp panel is in a range from a first height to a second height, and a height of a lowest point of the surface of the recessed portion is less than a third height;
   the first height is a distance from an intersection point to a plane where a surface of the edge light-emitting element away from the optical film is arranged, wherein the intersection point refers to a point that light, which is emitted from an outermost point of a side of the edge emitting element near the light-guide assembly, intersects with a plane where a side surface of the light-guide assembly is arranged;
   the second height is a sum of two thirds of a second distance and a thickness of the edge light-emitting element in the direction perpendicular to the lamp panel, wherein the second distance is from a surface of the edge light-emitting element near the optical film to the optical film;
   the third height is a distance from a third intersection point to a plane where a surface of the edge light-emitting element away from the optical film is arranged, and the third intersection point refers to a point that a first light intersects with a second light the first light is originally emitted from the outermost point of the side of the edge light-emitting element, which is arranged on a first light-emitting plate and near the seam, and is refracted by the light-guide assembly; and the second light is originally emitted from the outermost point of the side of the edge light-emitting element, which is arranged on a second light-emitting plate adjacent to the first light-emitting plate and is near the seam, and is refracted by the light-guide assembly.

2. The backlight module according to claim 1, wherein the surface of the recessed portion comprises a first surface and a second surface;

the light-guide assembly comprises a first side surface and a second side surface opposite to the first side surface in a width direction of the seam;

an angle between the first surface and the first side surface and/or an angle between the second surface and the second side surface is less than 90 degrees, and an angle between the first side surface and a corresponding light-emitting plate of the plurality of light-emitting plates is less than or equal to 90 degrees, and/or an angle between the second side surface and a corresponding light-emitting plate of the plurality of light-emitting plates is less than or equal to 90 degrees; and for the two adjacent light-emitting plates, an angle between refracted light and a direction where each of the two adjacent light-emitting plates is arranged is greater than 15 degrees, wherein the refracted light refers to a part of light emitted from the light-emitting element, which is arranged at an edge of either one of the two adjacent light-emitting plates near the seam, and refracted by the light-guide assembly.

3. The backlight module according to claim 1, wherein the light-guide assembly comprises a first body part and a second body part, the first body part is received inside the seam, and the second body part is arranged on a side of the first body part, and the second body part extends along the width direction of the seam to be further arranged on two of the plurality of light-emitting plates disposed at two sides of the seam.

4. The backlight module according to claim 3, wherein the light-guide assembly extends along an extension direction of the seam, a gap is defined between the first body part and each of the two adjacent light-emitting plates, and a width of the gap is in a range of 0.2 mm to 0.6 mm.

5. The backlight module according to claim 3, wherein a groove is defined in a surface of the first body part away from the second body part, and the light-guide assembly further comprises a light supplementing element, the light supplementing element is received in the groove.

6. The backlight module according to claim 5, wherein a bottom surface of the groove protrudes towards the second body part.

7. The backlight module according to claim 1, wherein a light mixing film layer is arranged on the surface of the recessed portion and is configured to mix light that propagates toward and reaches a side of the light-guide assembly away from the seam.

8. A method of controlling the backlight module, comprising:

starting up the backlight module according to claim 5;

detecting a first brightness value at the seam, and detecting a second brightness value of a light-emitting element, which is located at the edge of the light-emitting plate and is adjacent to the seam;

supplementing light to the seam based on the detected first brightness value and the detected second brightness value.

9. A display device, the display device comprises a backlight module, wherein the backlight module comprises:

a lamp panel, comprising a plurality of light-emitting plates spliced to each other, wherein a seam is generated between two adjacent light-emitting plates of the plurality of light-emitting plates, each of the plurality of light-emitting plates comprises a plurality of light-emitting elements; and a light-guide assembly, arranged at the seam, wherein a height of the light-guide assembly in a direction perpendicular to the lamp panel is greater than a height of each of the plurality of light-emitting elements, a surface of a side of the light-guide assembly away from the plurality of light-emitting plates is recessed toward the seam, and a part of light, which is emitted from any light-emitting element of the plurality of light-emitting elements arranged at edges of the two adjacent light-emitting plates and near the seam, is refracted by the light-guide assembly to propagate towards the seam; and an optical film, arranged on a side of each of the plurality of light-emitting elements away from the plurality of light-emitting plates;

wherein for each of the plurality of light-emitting plates, the plurality of light-emitting elements comprise an edge light-emitting element, arranged at an edge the light-emitting plate near the seam;

a height of a highest point of a surface of the recessed portion in the direction perpendicular to the lamp panel is in a range from a first height to a second height, and a height of a lowest point of the surface of the recessed portion is less than a third height;

the first height is a distance from an intersection point to a plane where a surface of the edge light-emitting element away from the optical film is arranged, wherein the intersection point refers to a point that light, which is emitted from an outermost point of a side of the edge emitting element near the light-guide assembly, intersects with a plane where a side surface of the light-guide assembly is arranged;

the second height is a sum of two thirds of a second distance and a thickness of the edge light-emitting element in the direction perpendicular to the lamp panel, wherein the second distance is from a surface of the edge light-emitting element near the optical film to the optical film;

the third height is a distance from a third intersection point to a plane where a surface of the edge light-emitting element away from the optical film is arranged, and the third intersection point refers to a point that a first light intersects with a second light the first light is originally emitted from the outermost point of the side of the edge light-emitting element, which is arranged on a first light-emitting plate and near the seam, and is refracted by the light-guide assembly; and the second light is originally emitted from the outermost point of the side of the edge light-emitting element, which is arranged on a second light-emitting plate adjacent to the first light-emitting plate and is near the seam, and is refracted by the light-guide assembly.

10. The display device according to claim 9, the surface of the recessed portion comprises a first surface and a second surface;

the light-guide assembly comprises a first side surface and a second side surface opposite to the first side surface in a width direction of the seam;

an angle between the first surface and the first side surface and/or an angle between the second surface and the second side surface is less than 90 degrees, and an angle between the first side surface and a corresponding light-emitting plate of the plurality of light-emitting plates is less than or equal to 90 degrees, and/or an angle between the second side surface and a corresponding light-emitting plate of the plurality of light-emitting plates is less than or equal to 90 degrees; and for the two adjacent light-emitting plates, an angle between refracted light and a direction where each of the two adjacent light-emitting plates is arranged is greater than 15 degrees, wherein the refracted light refers to a part of light emitted from the light-emitting element, which is arranged at an edge of either one of the two adjacent light-emitting plates near the seam, and refracted by the light-guide assembly.

11. The display device according to claim 9, wherein the light-guide assembly comprises a first body part and a second body part, the first body part is received inside the seam, and the second body part is arranged on a side of the first body part, and the second body part extends along the width direction of the seam to be further arranged on two of the plurality of light-emitting plates disposed at two sides of the seam.

12. The display device according to claim 11, wherein the light-guide assembly extends along an extension direction of the seam, a gap is defined between the first body part and each of the two adjacent light-emitting plates, and a width of the gap is in a range of 0.2 mm to 0.6 mm.

13. The display device according to claim 11, wherein a groove is defined in a surface of the first body part away from the second body part, and the light-guide assembly further comprises a light supplementing element, the light supplementing element is received in the groove.

14. The display device according to claim 13, wherein a bottom surface of the groove protrudes towards the second body part.

15. The display device according to claim 9, wherein a light mixing film layer is arranged on the surface of the recessed portion and is configured to mix light that propagates toward and reaches a side of the light-guide assembly away from the seam.

* * * * *